United States Patent Office 2,765,379
Patented Oct. 2, 1956

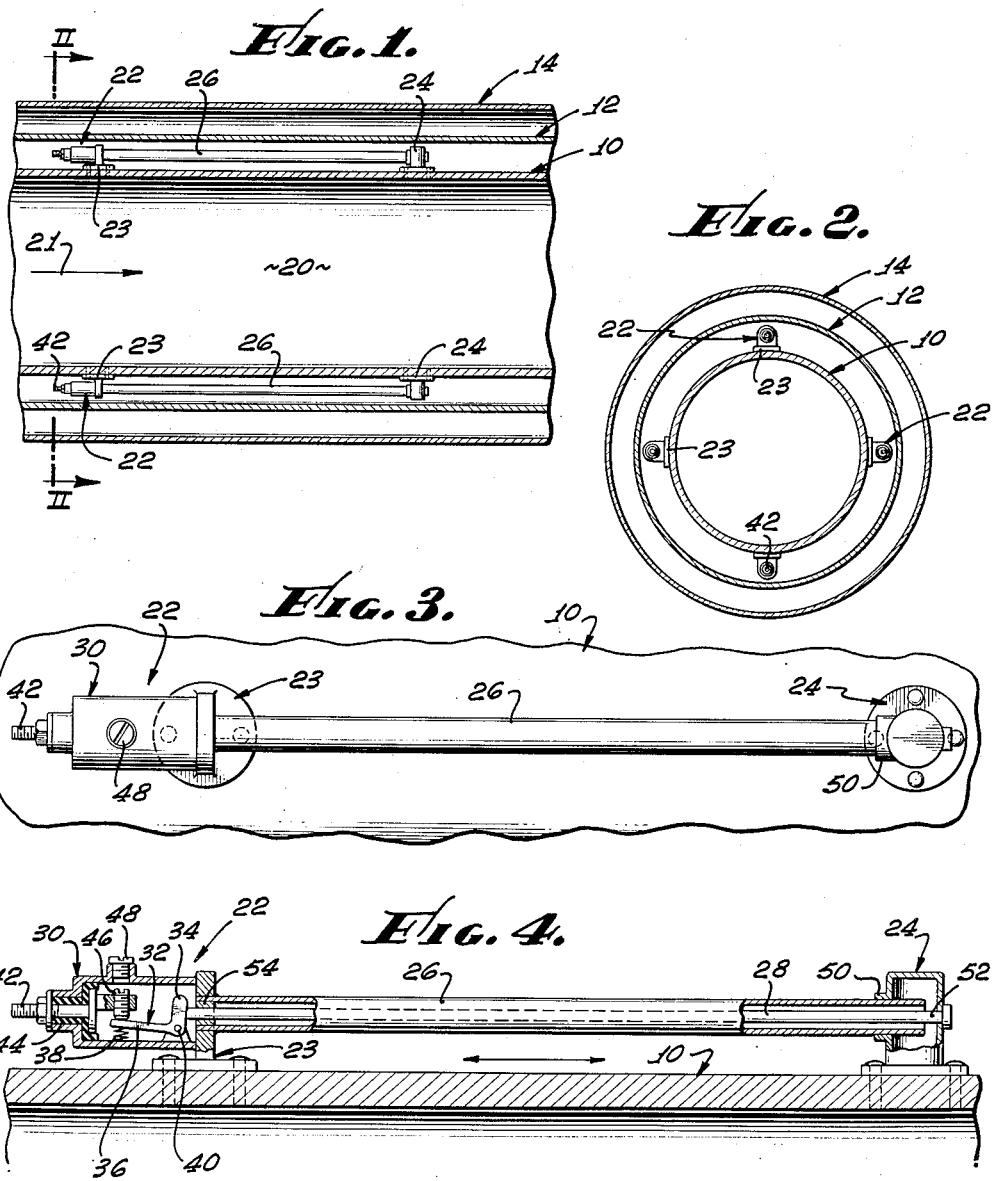

2,765,379

THERMOSTATIC SWITCH MOUNTING

Wayne E. Harness, North Hollywood, Calif., assignor to Walter Kidde & Company, Inc., Belleville, N. J., a corporation of New York Application June 3, 1955, Serial No. 512,994

6 Claims. (Cl. 200—137)

This invention relates generally to switch mountings and particularly describes a novel mounting useful in its preferred embodiment in connection with a thermostat which is required to respond to the temperature of a member which is expandable or contractable upon changes of temperature.

The need of measuring temperatures of relatively inaccessible portions of apparatus is well known. If the only requirement is that a signal be produced when the member exceeds a predetermined temperature, then conventionally, a thermostatic switch may be used. Such a device may be normally open and arranged to close when the temperature of a selected point exceeds or falls below a predetermined value. The present invention is useful in such applications and particularly has the advantage of responding directly to the temperature of a specific structural member, with the result that the present thermostatic switch mounting is exceedingly quick-acting where speed of indication is essential. Such requirements exist particularly in the case of jet aircraft engines, and the present invention will be illustratively described in connection with the afterburner housing or tube of such a structure although it will be readily appreciated by those skilled in the art that a switch mounting in accordance with the present invention may be advantageously used in many other applications.

Generally speaking the present invention contemplates the use of a longitudinal portion of a structural member or sample as an expansible element under conditions of increasing temperature. The switch mounting includes a longitudinal extending member having a temperature coefficient of expansion substantially different from that of the structural member whose temperature is to be indicated. Thus, in a simple form of the present invention a longitudinally extending rod made of ceramic or the like may be fixed at one end to the expansible structural member. Longitudinally displaced from the point of attachment of that end of the rod there is provided a second mounting member fixed to the structural member. Upon this second mounting member or bracket there is supported the thermostatic switch proper which is to be actuated by changes of temperature of the structural member or sample. Since the longitudinally extending rod has a temperature coefficient of expansion substantially different from that of the sample, changes of temperature of the sample result in changes of distance between the two mounting members with a resultant movement of the free end of the longitudinal rod relative to the mounting bracket carrying the thermostatic switch. This movement may then be translated into the making or breaking of an electrical circuit whereby to yield an appropriate signal.

An object of the present invention is therefore to disclose a novel mounting for a thermostatic switch.

Another object of the invention is to provide a thermostatic switch mounting permitting very rapid response of the thermostat to the temperature of a structural member whose temperature is to be sensed.

Still another object is to provide a thermostatic switch mounting particularly adapted for use with a tubular member or conduit carrying heated fluid.

A further object of the invention is to disclose a thermostatic switch mounting for attachment to a structural sample made of material which changes in longitudinal dimension as a result of temperature change.

A further object of the invention is to disclose a thermostatic switch mounting of the above characteristics including a longitudinally extending rod made of material having a temperature coefficient of expansion substantially different from that of the sample.

Still another object of the invention is to disclose apparatus for mounting a thermostatic switch on a structural member, which apparatus is reliable in operation and very economical to manufacture and install.

These and other objects and purposes of the invention will become clear from a reading of the following description of a preferred embodiment thereof taken in connection with the accompanying drawing in which:

Fig. 1 is a vertical sectional view showing thermostatic switch mountings of the present invention operatively mounted upon the upper and lower sides of a longitudinally extending structural sample, the sample in this illustration being the afterburner housing of a jet engine.

Fig. 2 is a transverse sectional view taken on line II—II of Fig. 1.

Fig. 3 is a plan view of the mounting of the present invention.

Fig. 4 is a fragmentary sectional view similar to Fig. 1 but on an enlarged scale and showing the details of a typical installation of the present invention.

As before mentioned, the present invention finds particular application in the sensing and indication of temperature changes in longitudinally extending members made of material subject to expansion or contraction with changes of temperature. This condition obtains in modern day jet engines, and the present illustration of the invention will be described in reference to such an application. In the afterburner of a jet engine burning gases exist at a temperature substantially above 1,000° F. For a particular application it may be assumed that the material of the afterburner housing may safely attain a temperature of 1,500° F. For reasons of engine design it is desired that the temperature of burning gases in the afterburner be as high as possible short of the point where such high temperature adversely affects the afterburner housing. Further, it is of the greatest importance that an immediate indication be given if the temperature of the afterburner housing approaches a dangerous value. Such a signal may alert the operator to take corrective action to prevent permanent damage to the engine, or the signal may be introduced into control equipment of known type for taking action automatically. In any event, corrective action must be taken promptly since otherwise a malfunction producing excessive temperature will rapidly cause permanent damage to the engine.

Referring now in detail to the drawing and first to Figs. 1 and 2 thereof, an afterburner housing of a jet engine is indicated generally at 10 and generally assumes the form of an elongated cylinder. Concentric with the housing 10 and outside thereof there is conventionally provided a cylindrical shroud indicated generally at 12, and in a typical installation of a jet engine in an aircraft a larger concentric portion of the outside skin or air frame surrounds the entire assembly, such skin being here indicated generally at 14.

Within the cylindrical afterburner housing 10 there is a quantity of burning gases indicated generally at 20, the gases being at high temperature and moving longitudinally of the housing in a direction here assumed to be from left to right as seen in Fig. 1 as indicated by the arrow 21.

The cylindrical housing 10 is made of metal especially designed to withstand high temperature. Both the housing 10 and the shroud 12 may be made of a steel alloy and the outer skin 14 is conventionally made of aluminum. A blast of cooling air is forced through the annular space between the housing 10 and the shroud 12 by suitable means, normally induced by movement of the aircraft when the engine is so used.

Upon the outer surface of the housing 10 and disposed within the cooling blast of air passing between the housing 10 and the shroud 12, there are one or more thermostatic switches indicated generally at 22 and fixedly mounted by suitable bracket means 23 to the housing 10. In the present illustration, four such switches are shown arcuately spaced about the housing, but more or fewer could be used if desired. Longitudinally displaced from the upper thermostat 22 and its mounting bracket 23 there is a second mounting member or bracket indicated generally at 24 and fixedly mounted upon the housing 10. Extending between the brackets 23 and 24 and fixed to bracket 23 is a hollow tubular member 26 (see Fig. 4) and within the tube 26 is a longitudinal rod 28.

Means are provided for opening or closing an electric switch in response to changes in length of the member 10 between the mounting brackets 23 and 24. A switch housing indicated generally at 30 is mounted upon the bracket 23 and fixed thereto by any suitable means. Within the thermostat housing 30 there is disposed a movable bell-crank member indicated generally at 32 including two angularly related arms 34 and 36. Resilient means, here schematically shown as spring 38, may be included to urge the bell-crank member 32 in a clockwise direction about its pivotal axis 40. A metallic bolt 42 extends through the neck of the thermostat housing 30 and is insulated therefrom by an insulating collar 44. The inner end of the bolt 42 supports an electrical contact including a set screw 46 which is contacted by the arm 36 of the bell-crank member 32 when the latter is caused to rotate clockwise about its pivot 40. It will be readily understood that refinements in design and operation of the switch and its components included in the housing 30 may be incorporated, but for purposes of the present invention, the simplified device just described is satisfactory. Means 48 permit adjustment of set screw contact 46. The entire structure including arm 36 is electrically grounded in known manner.

The bracket or mounting member 24, longitudinally spaced from the bracket 22, includes a ported boss 50, the opening or port facing toward the bracket 23 and thermostat housing 30. The tube or sleeve 26 is fixed to bracket 23 at its one end and at its other end is slidably carried in the port of boss 50. The rod 28 disposed within the sleeve 26 is fixed at its one end 52 to the bracket 24 and at its other end is slidably carried within a collar member 54 which in turn is fixed within the end of sleeve 26.

It will now be understood that a change in the distance between the bracket 23 and the bracket 24 will result in axial movement of the rod 28 in the supporting collar 54 as well as axial movement of the sleeve 26 in the port of boss 50. For example, if the temperature of sample 10 changes in such a way as to increase the distance between brackets 23 and 24, the bell-crank member 32 will move clockwise as seen in Fig. 4 about its pivot 40 because of the force of the spring 38. Such movement causes electrical contact to be made between the arm 36 and the contact member 46, thus completing an electrical circuit (not shown) for signalling an alarm or otherwise initiating corrective action for the excessive temperature which has caused expansion of the housing 10.

It will be now understood that the thermostat mounting of the present invention makes use of a longitudinal portion of the structural sample as an expansible member causing action of switch means when temperature becomes excessive. It will be further noted that a thermostat employing the present mounting is responsive directly to the temperature of the structural member or sample, and hence the time lag characteristic of heat responsive members generally is minimized.

For most purposes, it is desirable that the longitudinal rod 28 have a temperature coefficient of expansion which is small relative to that of the material constituting the housing 10. For example, it may be of tungsten alloy. However, since the rod 28 and its sleeve 26 are disposed in the path of cooling air within shroud 12, the expansion coefficient of rod 28 need not necessarily differ from that of the material constituting the housing 10. It is to be remembered that the present invention is particularly adapted for use in structures where the sensing of a change of temperature must be made virtually immediately in order that prompt corrective action may be taken to prevent permanent damage to the afterburner housing 10. Thus, in many instances the problem of possible heat transfer from the gases within the housing 10 to the rod 28 is of minor importance for the present invention. It will be understood by those skilled in the art that other different temperature sensing devices may be used in addition to the present device, the office or function of the present invention being principally to indicate as nearly instantaneously as possible a sudden increase in temperature of the afterburner housing.

Since one end of the tubular sleeve 26 is freely slidable in the ported boss 50 changes in length of the sleeve resulting from changes in temperature are not critical. The sleeve serves chiefly to strengthen the entire assembly and to impede or delay heat transfer from the sample 10 to the rod 28; the sleeve may be omitted entirely if desired.

It will be well understood by those skilled in the art that modifications and changes from the specific form of the invention here illustratively shown are within the contemplation of this invention and are intended to be embraced within the scope of the appended claims.

I claim:

1. A thermostatic switch mounting for attachment to a sample of varying linear dimension dependent upon its temperature comprising: a pair of mounting brackets adapted to be fixed to a sample at spaced points thereof; a tubular sleeve extending between said brackets, fixed to one bracket and slidably carried by the other; an elongated rod within the sleeve and spaced therefrom, fixed at one of its ends to one bracket and having its free end slidably supported by the other; and electric switch means carried by the bracket slidably supporting the free end of the rod, including electric contacts and means actuating said contacts to make or break position in response to movement of the free end of the rod relative to its supporting bracket.

2. The invention as stated in claim 1 wherein said mounting bracket slidably carrying the sleeve includes a side wall having an opening formed therein directed toward the other bracket, the sleeve being slidably received in said opening.

3. A thermostatic switch mounting for attachment to a sample subjected to varying temperature and having a temperature coefficient of expansion comprising: a first mounting bracket adapted to be fixed to the sample; a second mounting bracket adapted to be fixed to the sample spaced from the first; a hollow elongated tubular sleeve having its one end fixed to one of the brackets and its other end slidably carried by the other bracket; an elongated rod within the sleeve having its one end fixed to one of the brackets and its other end free to move longitudinally relative to the other bracket; and electric switch means for opening and closing a contact responsive to movement of said free end of the rod.

4. The invention as stated in claim 3 wherein the outside diameter of the rod is substantially smaller than the inside diameter of the sleeve.

5. The invention as stated in claim 3 wherein said sleeve is laterally spaced throughout its length from the sample.

6. The invention as stated in claim 3 wherein said rod is made of material having a temperature coefficient substantially different from that of the sample.

References Cited in the file of this patent

UNITED STATES PATENTS

| | | |
|---|---|---|
| 1,000,661 | Beers et al. | Aug. 15, 1911 |
| 1,025,576 | Kirkwood | May 7, 1912 |
| 1,075,991 | Ruud | Oct. 14, 1913 |
| 1,803,852 | Jackson | May 5, 1931 |